United States Patent Office 3,368,219
Patented Feb. 6, 1968

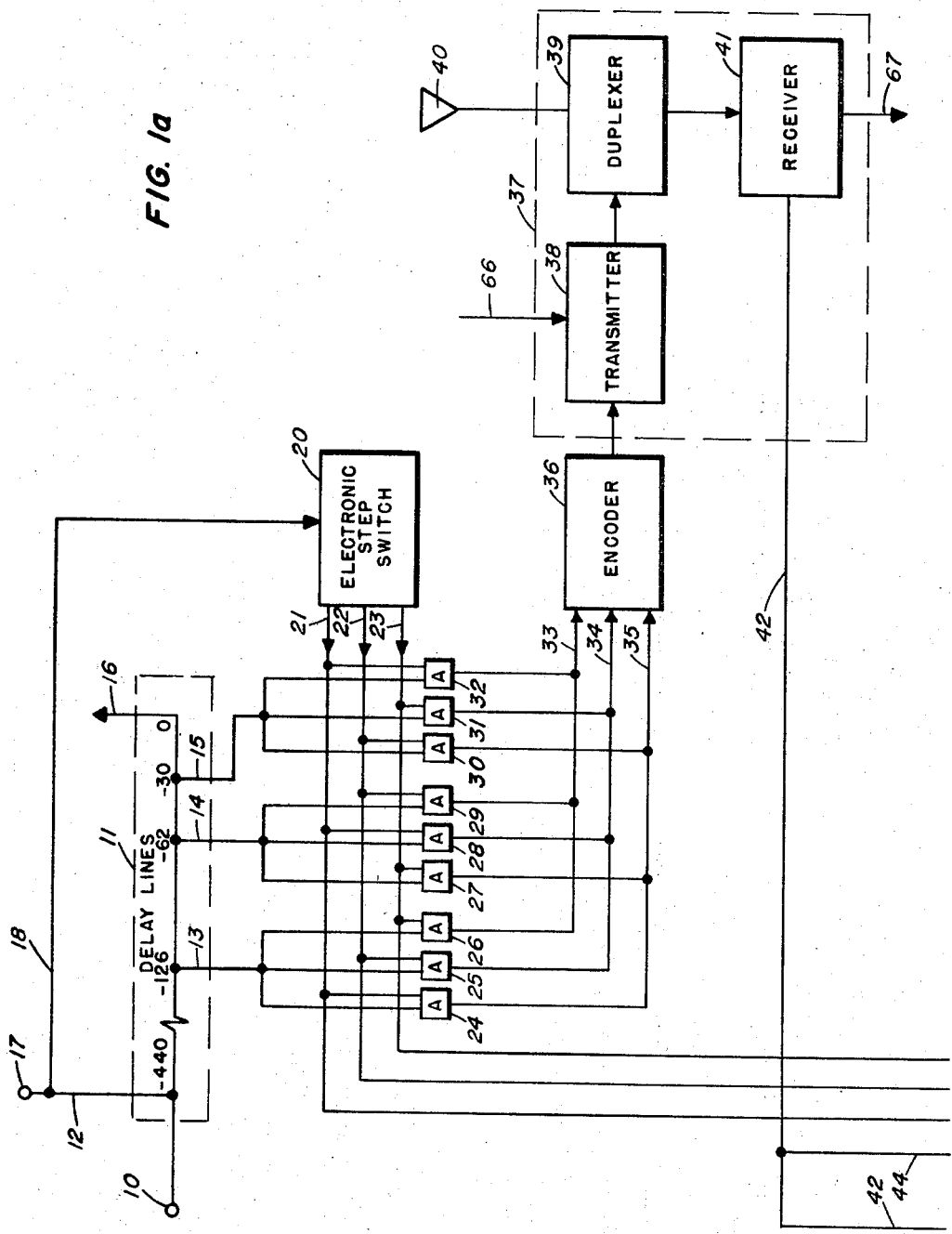

3,368,219
MULTI-MODE IFF SYSTEM
Joseph C. Gardner, Valley Lee, Md., assignor to the United States of America as represented by the Secretary of the Navy
Filed Nov. 28, 1966, Ser. No. 597,495
9 Claims. (Cl. 343—6.5)

The invention described herein may be manufactured and used by or for the Government of the United States of America for governmental purposes without the payment of any royalties thereon or therefor.

The present invention relates to an IFF interrogator and more particularly to an IFF interrogator wherein a number of modes of IFF may be interrogated during each interrogation period.

In military air operations in which radar equipped aircraft seeks out targets in the air, the pilot is aided in determining whether echo indications on his radar indicator screen are those of friendly or unfriendly aircraft by an interrogation-responder system, commonly known as "IFF," which stands for "Identification, Friend or Foe." The searching craft sends out an interrogation signal. In response to this signal a friendly craft, which is equipped with a transponder, transmits appropriate response signals, which are in code and which may be changed from time to time for security reasons. The response signals received are utilized for such purposes as causing a panel lamp to light up in the cockpit of the searching craft, or to deactivate the electric control system for the guns trained on the target aircraft.

In using IFF, it is desired that a secure system be provided and that a system be used that would not only decode emergency replies and indicate such replies, but also that the system decode Modes I, II and III and display these as well. Modes I and II are used by the military to interrogate the transponders on the aircraft while Mode III is the civil interrogation code. The various modes differ from each other in the spacing between pulses. For example, Mode I pulses may be spaced by three microseconds; Mode II by five microseconds, and Mode III by eight microseconds.

It frequently becomes necessary to interrogate all of the modes during a single, brief, fixed interrogation period. In the past multimode coverage has been accomplished by time storing or "mode interlace operation" wherein each mode is transmitted, and replies are received in sequence, one at a time. The disadvantage of such a system is obvious. For a large number of modes, the time available for coverage by each is drastically reduced. For example, should there be as many as five modes of operation required, the probability of identifying a target is reduced to one-fifth of that provided by single mode operation.

The present invention overcomes the above objectional weaknesses by providing both a novel time sharing scheme and novel apparatus to mechanize it, so that a system having several modes of operation may be interrogated during each time period. This vast improvement is accomplished by a time sharing or mode interlacing of only a portion of the total number of modes and a regular interrogation of the remaining modes. Thus, with a five mode system, for example, the two least used modes employ time sharing while the remaining three do not. This method of operation will result in three modes operating 100% of the time and the remaining two modes operating 50% of the time. In certain tactical situations where only three or four modes will ever be used this system will give 100% interrogations on all modes.

It is an object of the present invention to provide an improved multimode IFF system.

A further object is the provision of a new time-sharing scheme for multimode IFF systems.

A further object is the provision of a new multimode IFF system having substantially greater probability of contact than present multimode systems.

Still another object of this invention is the provision of a multimode IFF system wherein all of the modes are interrogated during each interrogation period.

Other objects and many of the attendant advantages of the invention will be readily appreciated as the same becomes better understood by reference to the following detailed description when considered in connection with the accompanying drawings in which:

FIGS. 1a and 1b show a circuit diagram of the invention;

Figure 1B:
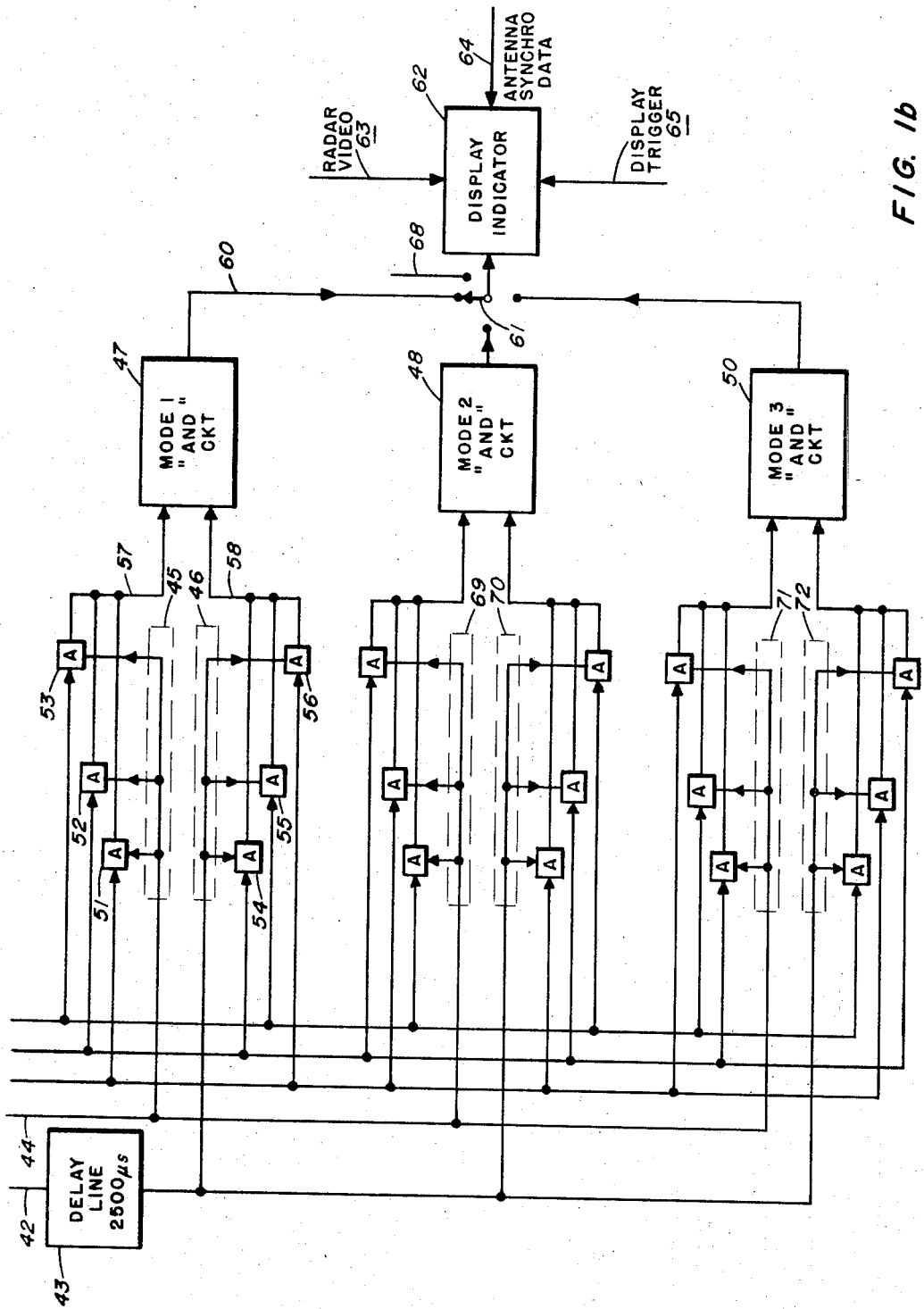

Referring now to the drawings, there is shown in FIGS. 1a and 1b an input terminal 10 which is used to apply an initiating trigger pulse to the system. Connected to input terminal 10 is a lead which goes to a delay line 11, the delay line having output terminals 12, 13, 14, 15 and 16. Output lead 12 supplies a signal to an output terminal 17 and also to a lead 18 which applies the signal on output 12 to an electronic step switch 20.

Electronic step switch 20 has three outputs, 21, 22 and 23, these outputs being energized in sequence as the switch 20 is repeatedly activated. Located nearby, and being energized by the outputs of switch 20 is a plurality of nine AND circuits 24–32 grouped into three groups of three units each. Each of the outputs 21, 22 and 23 from switch 20 applies an input to each of the groups of AND circuits. Thus output 21 furnishes an input signal to AND circuits 24, 28 and 32; output 22 furnishes an output signal to 25, 29 and 30; while output 23 furnishes an input signal to 26, 27 and 31.

In order to contribute another input to each of the AND circuits 24–32, connections are made to output terminals 13, 14 and 15 of delay line 11. Each output terminal is associated with one group of three AND circuits. Thus output 13 connects with 24, 25 and 26; output 14 connects with 27, 28 and 29; while output 15 connects with 30, 31 and 32. Should there be coincidence at the AND inputs, and therefore an output produced, this output would appear at one of the input terminals 33, 34 or 35 of an encoder 36.

Encoder 36, which determines the mode of the IFF system being interrogated, is connected to and drives an interrogator set 37 which is made up of a transmitter 38, a duplexer 39, an antenna 40, and a receiver 41. When an interrogating pulse is being transmitted to some unknown target, the mode of the interrogation signal is passed from encoder 36 to transmitter 38 through duplexer 39 and out antenna 40.

When a coded reply is returned by the target it is taken by antenna 40, passed through duplexer 39 on to receiver 41, where the signal is processed prior to its application to the decoding portion of the system. The output of receiver 41 is fed along a lead 42 until it is impressed on a 2500 microsecond delay line 43. The decoding circuit consists generally of three channels, each one designed to pass signals appropriate for Mode 1, Mode 2, or Mode 3, provided responses and conditions are right, in that particular channel. Each channel consists of two delay lines and three AND circuits associated with each delay line. Since all three channels are alike, for the sake of simplicity only one will be described in detail.

In the Mode 1 channel, for example, there is a delay line 45 with AND circuits 51, 52 and 53 connected to its output taps at varying amounts of time delay. The other half of the channel consists of delay line 46, with AND circuits 54, 55 and 56 connected to its output taps. Signals from electronic step switch 20 are fed via outputs 21, 22 and 23 to one of the inputs of AND circuits 51–56, while delay lines 45 and 46 furnish the other inputs. The input to delay line 45 is obtained from lead 44 which in turn is connected to lead 42, the output of receiver 41. The input to the other delay line, delay 46, is obtained from 2500 microsecond delay line 43, and from this arrangement it is clear that of the two signals applied to the Mode 1 channel, one is delayed 2500 microseconds with respect to the other, before the signals are further delayed by 45 and 46.

The outputs of AND circuits 51, 52 and 53 are combined into lead 57, while those of AND circuits 54, 55 and 56 combine into lead 58, these two leads 57 and 58 forming parallel inputs to a Mode 1 circuit 47. The output of AND circuit 47 is connected via lead 60 to one position on a rotary switch 61.

As pointed out above, the decoding channels for Modes 2 and 3 are similar to the one just described for Mode 1 in the number and operation of components. The output of Mode 2 AND circuit 48 is applied to rotary switch 61, as is the output of Mode 3 AND circuit 50.

When a response is received from a target and the signal has been decoded by its proper channel, a visual presentation is given on a display indicator 62 which is generally some form of cathode ray tube. This reply in an IFF system is utilized in conjunction with normal radar display, the radar video signals are applied to indicator 62 via lead 63, along with antenna synchro data via lead 64, and a display trigger signal via lead 65.

Turning now to a detailed description of the operation of the invention, it should be noted that the initiating trigger that is presented to delay line 11, via input terminal 10, must be of the same repetition time as the delay line 43, which will be discussed later. Output lead 16 is the output tap from delay line 11 which is used to trigger associated radar equipment and display equipment. This time will be referred to as time zero, so that the input trigger at terminal 10 will then precede the radar trigger on lead 16 by 440 microseconds.

The input trigger on terminal 10 is also fed via leads 12 and 18 to the electronic step switch 20, in addition to serving the Mode 4 trigger. Mode 4 may be a little-used military security mode and, as such, the equipment requires only a trigger from existing IFF and radar equipment so that the returns may be synchronized. The Mode 4 signal to be transmitted is fed into transmitter 38 via a lead 66 from equipment not shown. The received Mode 4 replies are taken from receiver 41 at lead 67, processed and fed to the display indicator 62 through line 68 connected to rotary mode selector switch 61. This brief discussion of Mode 4 operation is all that is believed to be necessary since it is a self dependent system requiring only basic synchronization with the system under discussion.

In the present system, the time available preceding the radar trigger will allow an additional three modes to be transmitted. The outputs 13, 14 and 15 from delay line 11 are each fed to three AND circuits, as for example, output 13 feeds 24, 25 and 26; output 14 feeds 27, 28 and 29; and output 15 feeds 30, 31 and 32. At the same time it should be noted that the delay line outputs 13, 14 and 15 are each progressively shorter in duration to the point of approaching a logarithmically tapped delay line. Each input trigger on terminal 10 that leads the delay line 11 will also step the electronic stepping switch 20 one time so the enabling lines 21, 22 and 23 will alternately be energized and repeated in the order 21, 22, 23, 21 . . . . and so on.

To use a specific example, assume that line 21 is energized thereby applying an energizing voltage to AND circuits 24, 28 and 32. Then should a mode trigger appear on line 13, there would be a coincidence of signals on AND circuit 24 with a resulting output signal to input 35 of encoder 36. Likewise, by the proper coincidence of voltages on the remaining AND circuits a signal may appear at 34 for Mode 2 triggering, or at 33 for Mode 1 triggering. The trigger signals appearing at 33, 34 or 35, as the case may be, are encoded by 36, passed on to transmitter 38, through duplexer 39, and out antenna 40 to the target being interrogated.

The response pulses is passed through antenna 40, duplexer 39, and receiver 41 onto common signal line 42 where it is applied to both delay line 43 and lead 44. In the decoding channel for Mode 1, for example, the undelayed return pulse on lead 44 is applied to delay line 45 while the delayed return pulse from delay 43 is applied to delay line 46. Signals from delay lines 45 and 46 are in turn impressed upon AND circuits 51–53 and 54–56, respectively, as one of their inputs, while signals from the step switch 20, along lines 21, 22 or 23, are applied on the other inputs to these AND circuits. When there is a signal on both inputs simultaneously an output appears on lead 57 or 58 which is fed to Mode 1 AND circuit 47. The output from Mode 1 AND circuit 47 is fed along lead 60, through rotary mode selector switch 61 to the display indicator 62. The operation of the decoding channels for Modes 2 and 3 is similar to that for Mode 1 just described, and the position of rotary mode selector switch 61 determines which of the mode replies are to be shown on display indicator 62.

Figure 2:
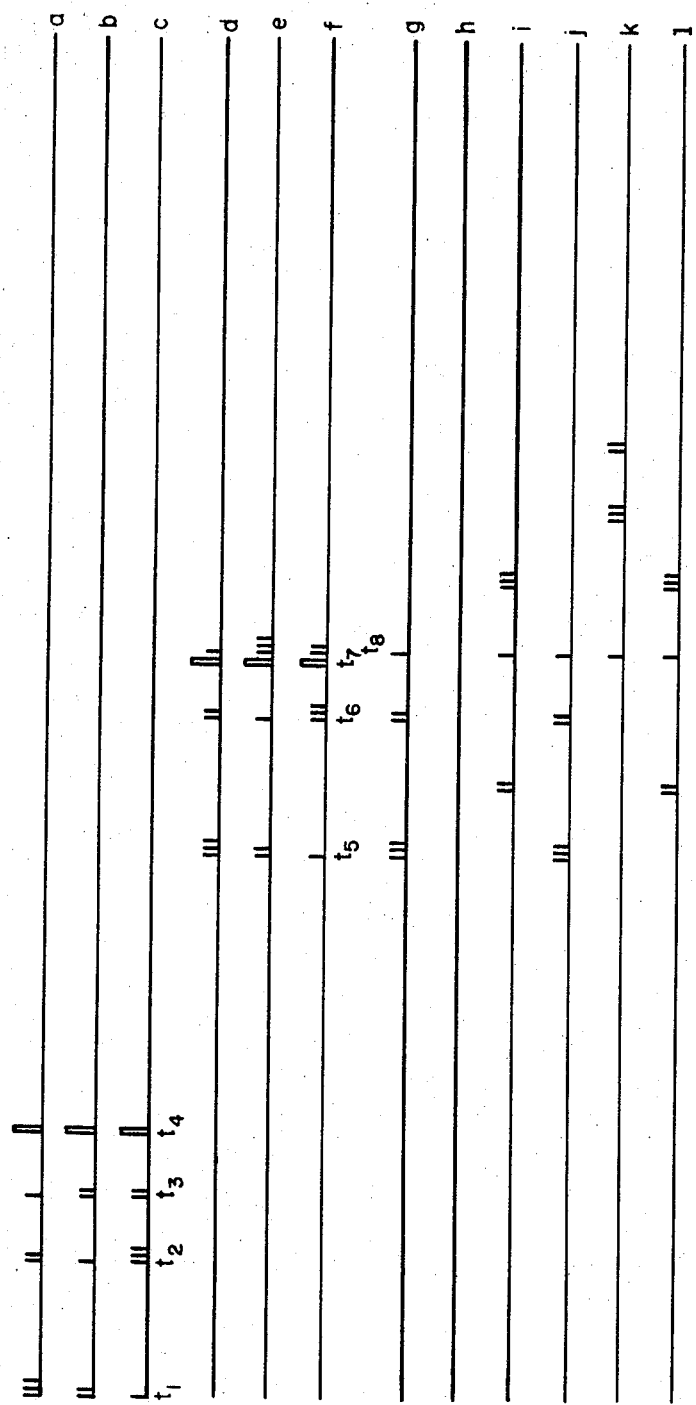
FIG. 2 shows a timing chart of the various pulses employed in the invention.

Referring now to FIG. 2, the time sequence of the various steps of the system will be examined. The transmitted signals are represented in the correct time sequence in line $a$ of FIG. 2, the pulse at $t_4$ being the radar pulse which is transmitted from a separate radar set. The single pulse at $t_3$ represents a Mode 1 transmission, the two pulses at $t_2$ represent a Mode 2 transmission, and the three pulses at $t_1$ represent a Mode 3 transmission. The transmitted modes will not actually have this pulse code configuration, which is used here only for illustration. Mode 1 precedes the radar pulse by 30 microseconds, Mode 2 by 62 microseconds, and Mode 3 by 126 microseconds. Upon receipt of the next input trigger on lead 10, step switch 20 advances and enabling line 22 is energized, thereby causing the mode sequence in line $b$ of FIG. 2. The third input trigger pulse will cause enabling line 23 to be energized, thereby permitting the modes to be transmitted in the sequence shown in line $c$ of FIG. 2. It is noted here that no one mode is ever transmitted in the same slot in any two consecutive transmissions. In effect, the delay time at each mode for each transmission is purposely varied or jittered so that all modes are actually transmitted at a different repetition rate for each transmission.

The pulses shown in lines $d$, $e$ and $f$ of FIG. 2 are the received replies to interrogations. It is noted here that all of the IFF mode replies $t_5$, $t_6$ and $t_8$ have shifted in time with respect to the radar echo return $t_7$. This is because of the coding and encoding delay times required in the IFF two-way system. Follow through several cycles of Mode 1 separation from the remaining modes appearing on common video return line 42. When Mode 1 was transmitted, on the first cycle, it was leading the radar pulse by 30 microseconds as shown in line $a$ of FIG. 2. The Mode 1 return for the first cycle is now slightly delayed with respect to the radar pulse (line $d$ of FIG. 2). The Mode 1 reply is now in the correct position for display; therefore, AND circuit 51 is enabled by enabling line 21 from electronic step switch 20 and no additional delay being applied to the return signal, the signal as it appears in line $g$ of FIG. 2 is applied to input 57 of the Mode 1 coincidence circuit 47. The other input of Mode 1 coincidence circuit 47 is applied through delay line 43 and Mode 1 variable delay line 46 to lead 58. Since there was no previous transmission, no signal appears on the second input, or lead 58, of Mode 1 coincidence circuit 47 as shown on line $h$ of FIG. 2 and, therefore, there will not be an output at the Mode 1 circuit for the first transmission. In the replies to the second interrogation sequence as appears in line e of FIG. 2, it is noted that the Mode 1 return precedes its correct position by 32 microseconds. Enabling line 22 now energizes AND circuit 52 in the present video line and delays the video by an additional 32 microseconds. This video as illustrated in line l of FIG. 2 is presented to input 57 of circuit 47. The video from the previous sweep meanwhile has been traveling through delay line 43 and variable delay 45. Since the Mode 1 return signal for the previous sweep was in the correct position for display, it needs no additional delay; therefore, AND circuit 54 is energized by enabling line 22 and the Mode 1 reply is presented to the other input terminal (58) of Mode 1 coincidence circuit 47 as it appears on line j of FIG. 2. The present processed video returns, line i and the delayed processed video returns, line j, appears simultaneously at the two inputs to circuit 47. Comparison of lines i and j shows that even though all modes of the IFF video are present at both inputs, only the Mode 1 video signals are in time coincidence. Therefore, only the Mode 1 signals will be available for presentation through circuit 47, along line 60, and through rotary switch 61 to the display indicator 62. If the same process is followed for the third interrogation sequence, it can be seen that for the present and delayed video inputs to the Mode 1 coincidence circuit 47, lines k and l, respectively, that only the Mode 1 processed video falls in time coincidence, and since none of the other mode replies fall in the same time slots for two consecutive periods, only the Mode 1 replies will be reproduced at the output of coincidence AND circuit 47.

It is necessary that the delay time of delay line 43 equal the input repetition time so that the delayed video will always fall into the correct time slot when the incremental delays before transmission and after reception are applied. The mode operation delay lines 45, 46, 69, 70, 71 and 72 are complementary to the input delay line 11, which is used to simulate a random mode repetition rate. The two complementary delay lines will always combine so that the outputs of the mode coincidence circuits 47, 48 and 56 will always fall into the correct time slot for proper display.

The Mode 2 and Mode 3 separation would be accomplished identically as described above for Mode 1. It should be remembered that the pulse coding and times shown in FIG. 2 are not intended to be actual times or codes, and as used herein are for illustrative purposes only. As stated earlier, the military now requires five modes of operation. The system disclosed here which forms the basis for invention will only accommodate four modes; that is, Mode 4 plus three additional modes, but it should be understood that if it becomes necessary to utilize all five modes of operation, the two least-used modes may be attenuated. Another alternative would be to pre-trigger the Mode 4 trigger by some additional amount before transmission, and delay it to the same amount before presentation on the display indicator. If this additional time is chosen carefully, it would create an additional time slot which would be available for the fifth mode of operation to be incorporated into the present system.

From the above description of the present invention, it is obvious that the system offers considerable improvement over prior known IFF equipment. A number of different interrogation modes may be performed by the invention within a very brief span of time and with a high degree of reliability.

Obviously many modifications and variations of the present invention are possible in the light of the above teachings. It is therefore to be understood that within the scope of the appended claims, the invention may be practiced otherwise than as specifically described.

What is claimed is:
1. A multimode IFF interrogating system comprising input means for receiving a triggering pulse;
first time delay means connected to the input means;
means connected to the input means for sequentially energizing a plurality of enabling means;
a plurality of AND circuits connected to the enabling means;
encoder means energized by the AND circuits;
an interrogator driven by the encoder to emit interrogating signals and receive replies;
decoding means for receiving and processing the replies; and
display means for indicating coincidence of the energizing of the enabling means and the receipt of replies.

2. The multimode IFF interrogating system of claim 1 wherein the first time delay means has an output for each mode of interrogation.

3. The multimode IFF interrogating system of claim 2 wherein the plurality of AND circuits are grouped according to interrogating modes, each AND circuit having one input connected to the first time delay means and the other input connected to one of the enabling means.

4. The multimode IFF interrogating system of claim 3 wherein the interrogator consists of a transmitter, receiver, duplexer, and antenna.

5. The multimode IFF interrogating system of claim 4 wherein the decoding means comprises a second time delay means, a plurality of decoding channels, and a plurality of mode AND circuits.

6. The multimode IFF interrogating system of claim 5 wherein the decoding channels each comprise two signal paths, each signal path having a delay means and a plurality of AND circuits.

7. The multimode IFF interrogating system of claim 6 wherein the AND circuits of one signal path are energized by the enabling means and the receiver of the interogator while the AND circuits of the other signal path are energized by the enabling means and the second time delay means.

8. The multimode IFF interrogating system of claim 7 wherein there is a mode AND circuit associated with each decoding channel and the inputs of each mode AND circuit are supplied by the two signal paths of that particular channel.

9. The multimode IFF interrogating system of claim 8 further including a selector switch connected to the display means for selecting the mode whose signals are to be displayed.

No references cited.

RICHARD A. FARLEY, *Primary Examiner.*

M. F. HUBLER, *Assistant Examiner.*